(12) United States Patent
Watanabe et al.

(10) Patent No.: US 11,660,953 B2
(45) Date of Patent: May 30, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/237,891

(22) Filed: Apr. 22, 2021

(65) Prior Publication Data

US 2021/0370759 A1 Dec. 2, 2021

(30) Foreign Application Priority Data

May 26, 2020 (JP) .............................. JP2020-091090

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC ............................. B60K 11/085; B60K 11/06
See application file for complete search history.

(56) References Cited

U.S. PATENT DOCUMENTS

| 9,297,260 | B2 * | 3/2016 | Tanaka | B64C 23/005 |
| 2005/0121240 | A1 * | 6/2005 | Aase | F15D 1/10 |
| | | | | 180/68.1 |
| 2012/0247018 | A1 * | 10/2012 | Stokes | B60K 11/085 |
| | | | | 49/89.1 |
| 2015/0315955 | A1 * | 11/2015 | Nam | F01P 7/10 |
| | | | | 123/41.04 |
| 2016/0016617 | A1 * | 1/2016 | Wolf | B60K 11/04 |
| | | | | 296/208 |
| 2017/0136872 | A1 * | 5/2017 | Ribaldone | B62D 37/02 |

FOREIGN PATENT DOCUMENTS

| JP | 2010-119946 A | 6/2010 |
| JP | 2014-189245 A | 10/2014 |

* cited by examiner

*Primary Examiner* — Kurt Philip Liethen
(74) *Attorney, Agent, or Firm* — McGinn I.P. Law Group, PPLC.

(57) ABSTRACT

An airflow adjusting apparatus includes a duct, a duct opening-closing unit for the duct, first and second airflow generators, and an airflow adjustment processor. The duct has an inlet open toward a front of a movable body and an outlet that guides an airflow to an air-blowing target inside the movable body. The first and second airflow generators are provided respectively on first and second faces, opposed to each other, of an inner surface of the duct. The airflow adjustment processor performs, if the duct opening-closing unit is closed, vortex flow formation control of causing the first airflow generator to generate a first airflow that directs to the outlet side with respect to the duct and causing the second airflow generator to generate a second airflow that directs to the inlet side with respect to the duct.

19 Claims, 9 Drawing Sheets

AIRFLOW ADJUSTING APPARATUS

CROSS-REFERENCE TO RELATED APPLICATIONS

The present application claims priority from Japanese Patent Application No. 2020-091090 filed on May 26, 2020, the entire contents of which are hereby incorporated by reference.

BACKGROUND

The technology relates to an airflow adjusting apparatus that adjusts, for example, an airflow in and around a duct provided in a movable body, such as a vehicle.

In a vehicle, such as an automobile, traveling wind is introduced into an engine room, for example, from a duct provided on an exterior member, such as a bumper face, at a front end of the vehicle body, to cool a cooling target, such as a radiator, a condenser of an air conditioner, or an intercooler.

In recent years, such a duct provided with an openable and closable shutter, e.g., an active shutter, has been known. This duct reduces air resistance, for example, by closing the shutter in a case where, for example, cooling load is small and vehicle speed is high.

As a technique related to such a variable duct with a shutter, Japanese Unexamined Patent Application Publication (JP-A) No. 2014-189245, for example, discloses a configuration in which, near a front end of an engine room, a duct that introduces an airflow into a radiator is provided with a shutter.

In addition, a technique has been proposed that performs adjustment of an airflow flowing around a vehicle body by using a device that actively generates an airflow.

For example, JP-A No. 2010-119946 discloses using a plasma actuator including an electrode pair that generates an airflow by generation of plasma, to perform airflow adjustment in, for example, a recess formed on a surface of a vehicle body.

SUMMARY

An aspect of the technology provides an airflow adjusting apparatus including a duct, a duct opening-closing unit, a first airflow generator, a second airflow generator, and an airflow adjustment processor. The duct has an inlet on an inlet side and an outlet on an outlet side. The inlet is open toward a front of a movable body. The outlet is configured to guide an airflow to an air-blowing target inside the movable body. The duct opening-closing unit is configured to open and close the duct. The first airflow generator is provided on a first face of an inner surface of the duct. The second airflow generator is provided on a second face of the inner surface of the duct. The second face is opposed to the first face. The airflow adjustment processor is configured to, in a case where the duct opening-closing unit is in a closed state, perform vortex flow formation control of causing the first airflow generator to generate a first airflow that directs to the outlet side with respect to the duct and causing the second airflow generator to generate a second airflow that directs to the inlet side with respect to the duct.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In a movable body, such as a vehicle, including a duct with a shutter, for example, in a case where the shutter is put into a closed state, a recess formed by the duct can disturb an airflow flowing around an exterior of the movable body, which can worsen air resistance and aerodynamic noise.

It is desirable to provide an airflow adjusting apparatus that appropriately adjusts an airflow around a duct provided with an opening-closing unit.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

In the following, an airflow adjusting apparatus according to a first example embodiment of the technology is described.

The airflow adjusting apparatus according to the first example embodiment may be provided, for example, at a front end of a vehicle body of a vehicle, e.g., an automobile, such as a passenger car.

Figure 1:
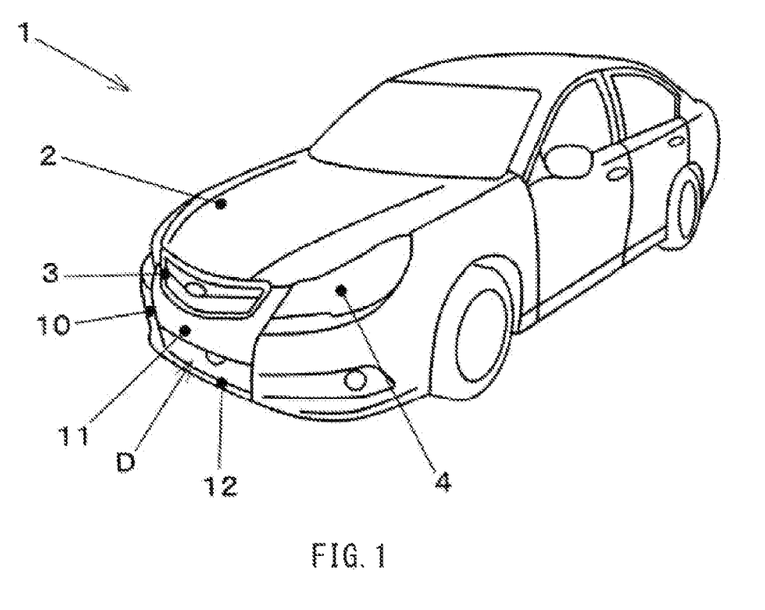
FIG. 1 is an appearance perspective view of an example of a vehicle including an airflow adjusting apparatus according to one example embodiment of the technology.

FIG. 1 is an appearance perspective view of an example of a vehicle 1 including the airflow adjusting apparatus according to the first example embodiment. In one embodiment, the vehicle 1 may serve as a "movable body".

The vehicle 1 may include an engine room 2, a grille 3, a front combination lamp 4, and a bumper face 10. The engine room 2 may be provided at a front part of the vehicle body. The engine room 2 may contain a power unit, such as an engine. The grille 3 and the front combination lamp 4 may be provided at a front end of the engine room 2. The bumper face 10 may be provided below the grille 3 and the front combination lamp 4.

The grille 3 may be a radiator grille. The radiator grille may have an opening. The opening may be configured to introduce, into the engine room 2, an airflow, e.g., traveling wind, flowing in from the front side of the vehicle. In one embodiment, the grille 3 may serve as an "opening".

The front combination lamp 4 may be provided on both sides across the grille 3 in a vehicle widthwise direction. The front combination lamp 4 may be a unit including various lamps that are contained in a common housing. Non-limiting examples of the various lamps may include a headlamp, a position lamp, and a turn signal lamp.

The bumper face 10 may be an exterior member provided at a lower half part of the front end of the vehicle body. The bumper face 10 may be a one-piece member, for example, including a resin material, such as polypropylene (PP).

The bumper face 10 may include a body 11 and an air dam part 12, for example.

The body 11 may be disposed below the grille 3 and the front combination lamp 4, for example.

The air dam part 12 may be disposed below the body 11, being spaced from the body 11.

A space between the body 11 and the air dam part 12 may serve as a duct D into which traveling wind for cooling is introduced.

The duct D has an inlet open toward the front of the vehicle, and an outlet disposed to be opposed to a radiator 30, for example. The outlet of the duct D may be configured to guide cooling air to the radiator 30, for example. The radiator 30 will be described later.

The airflow adjusting apparatus according to the first example embodiment may be provided at the duct D.

The inlet of the duct D may be open toward the front of the vehicle 1.

The outlet of the duct D may guide an airflow to the radiator 30 and a condenser 40 provided inside the vehicle 1. The radiator 30 and the condenser 40 may serve as an air-blowing target.

Figure 2:
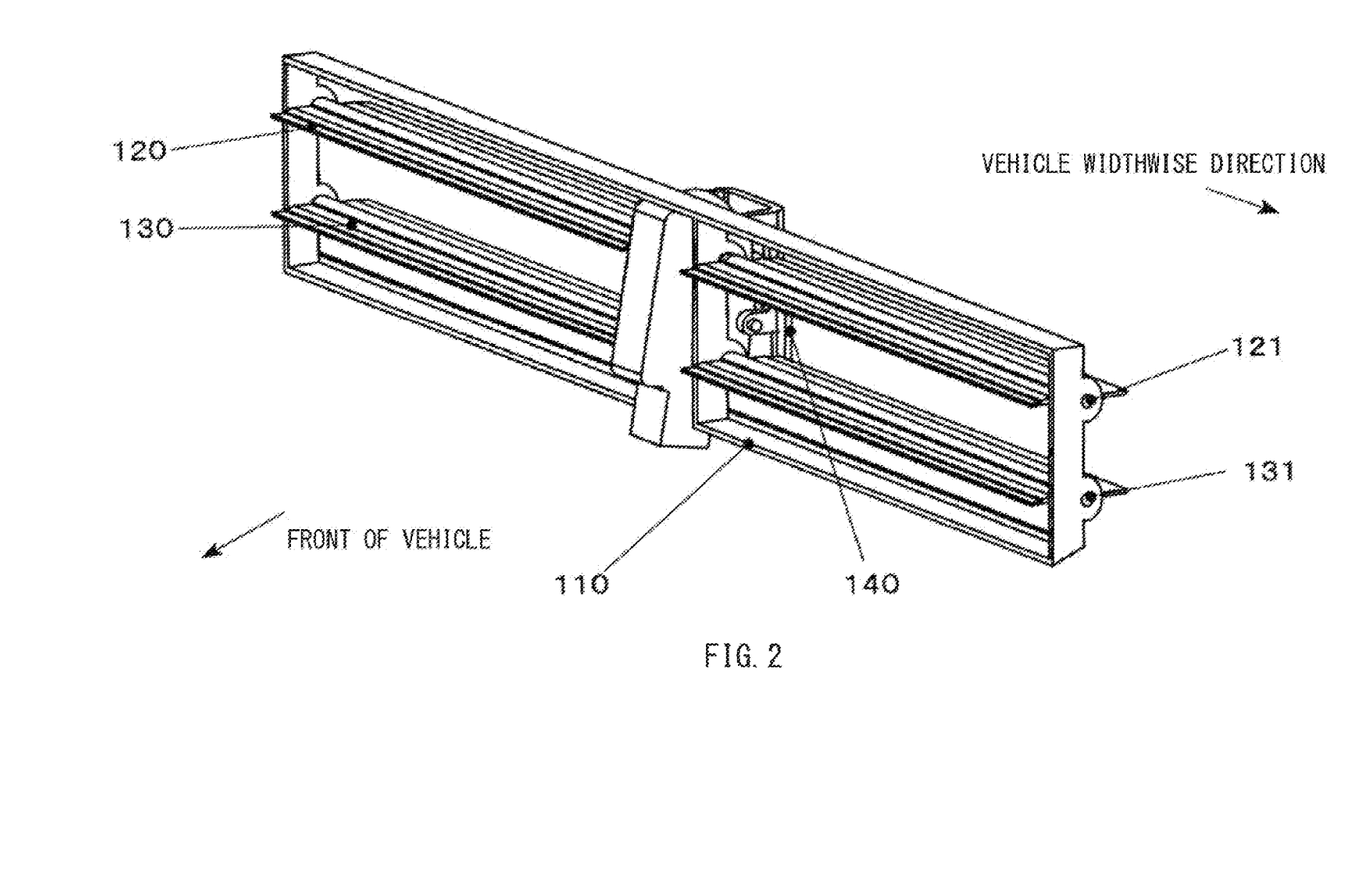
FIG. 2 is an appearance perspective view of an example of a shutter of the airflow adjusting apparatus according to one example embodiment.

FIG. 2 is an appearance perspective view of an example of a shutter 100 of the airflow adjusting apparatus according to the first example embodiment.

Figure 3:
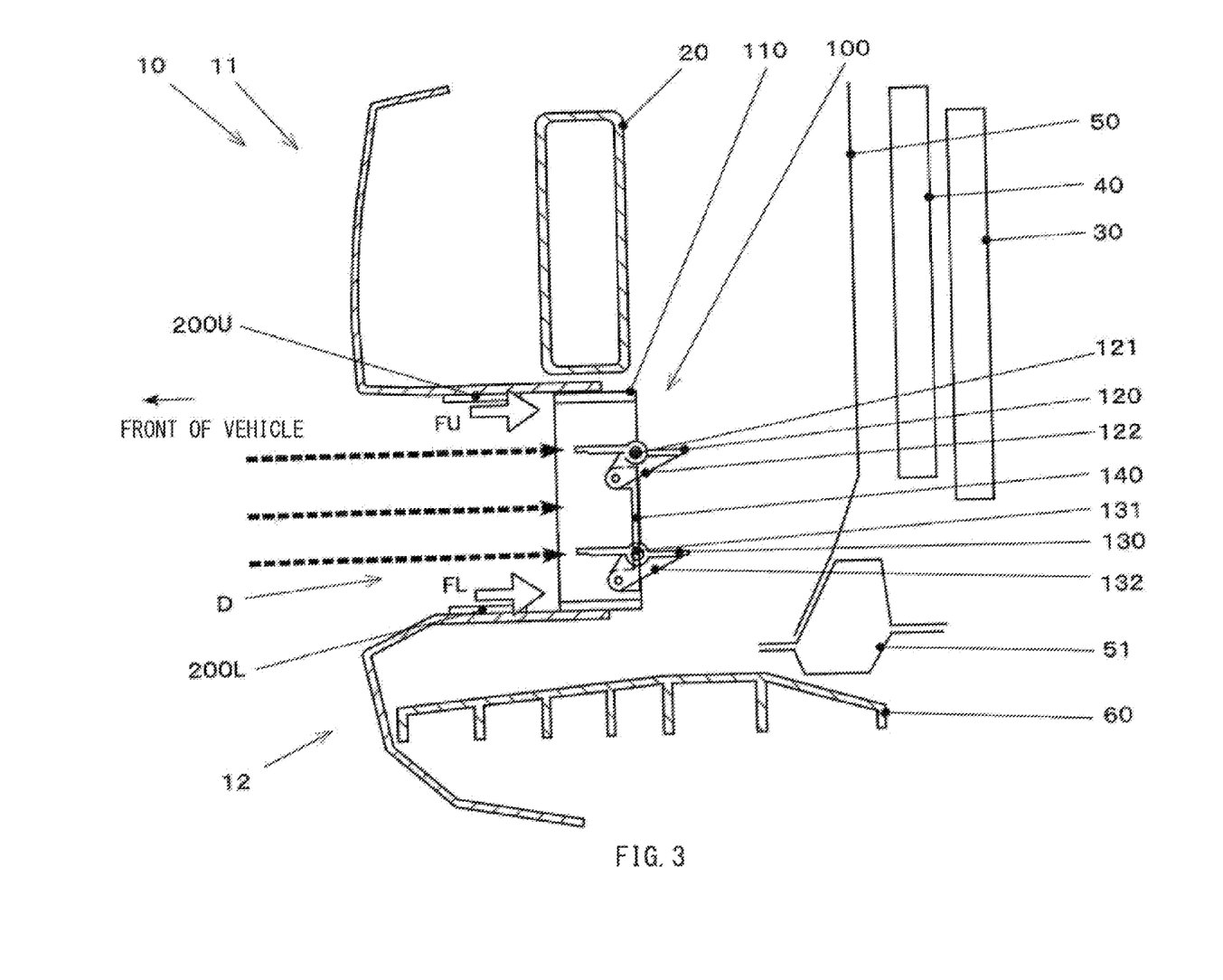
FIG. 3 is a schematic cross-sectional view of an example of a front end of a vehicle body of the vehicle including the airflow adjusting apparatus according to one example embodiment, illustrating a state in which the shutter is open.

FIG. 3 is a schematic cross-sectional view of an example of the front end of the vehicle body of the vehicle 1 including the airflow adjusting apparatus according to the first example embodiment, illustrating a state in which the shutter 100 is open.

Figure 4:
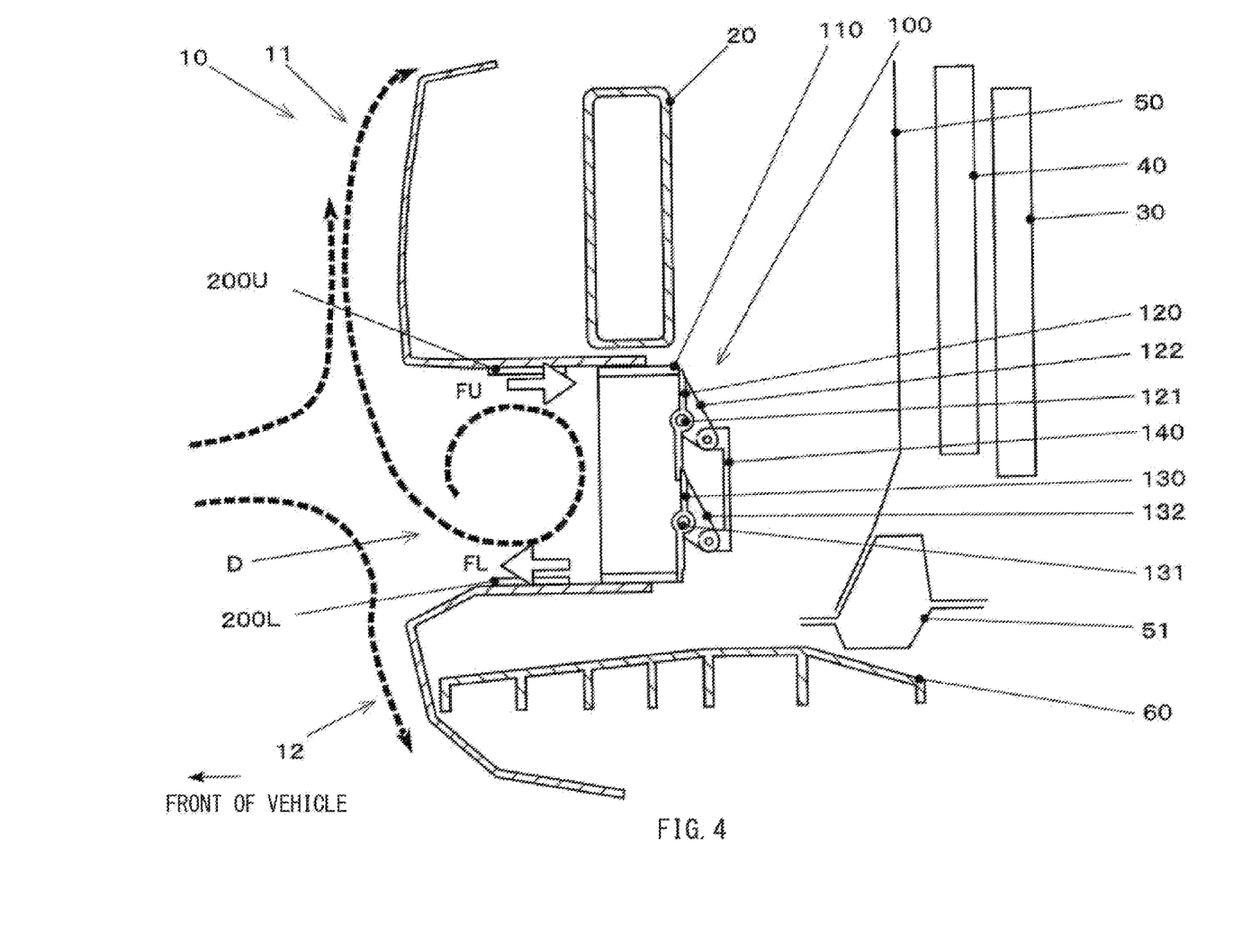
FIG. 4 is a schematic cross-sectional view of an example of the front end of the vehicle body of the vehicle including the airflow adjusting apparatus according to one example embodiment, illustrating a state in which the shutter is closed.

FIG. 4 is a schematic cross-sectional view of an example of the front end of the vehicle body of the vehicle 1 including the airflow adjusting apparatus according to the first example embodiment, illustrating a state in which the shutter 100 is closed.

Figure 5:
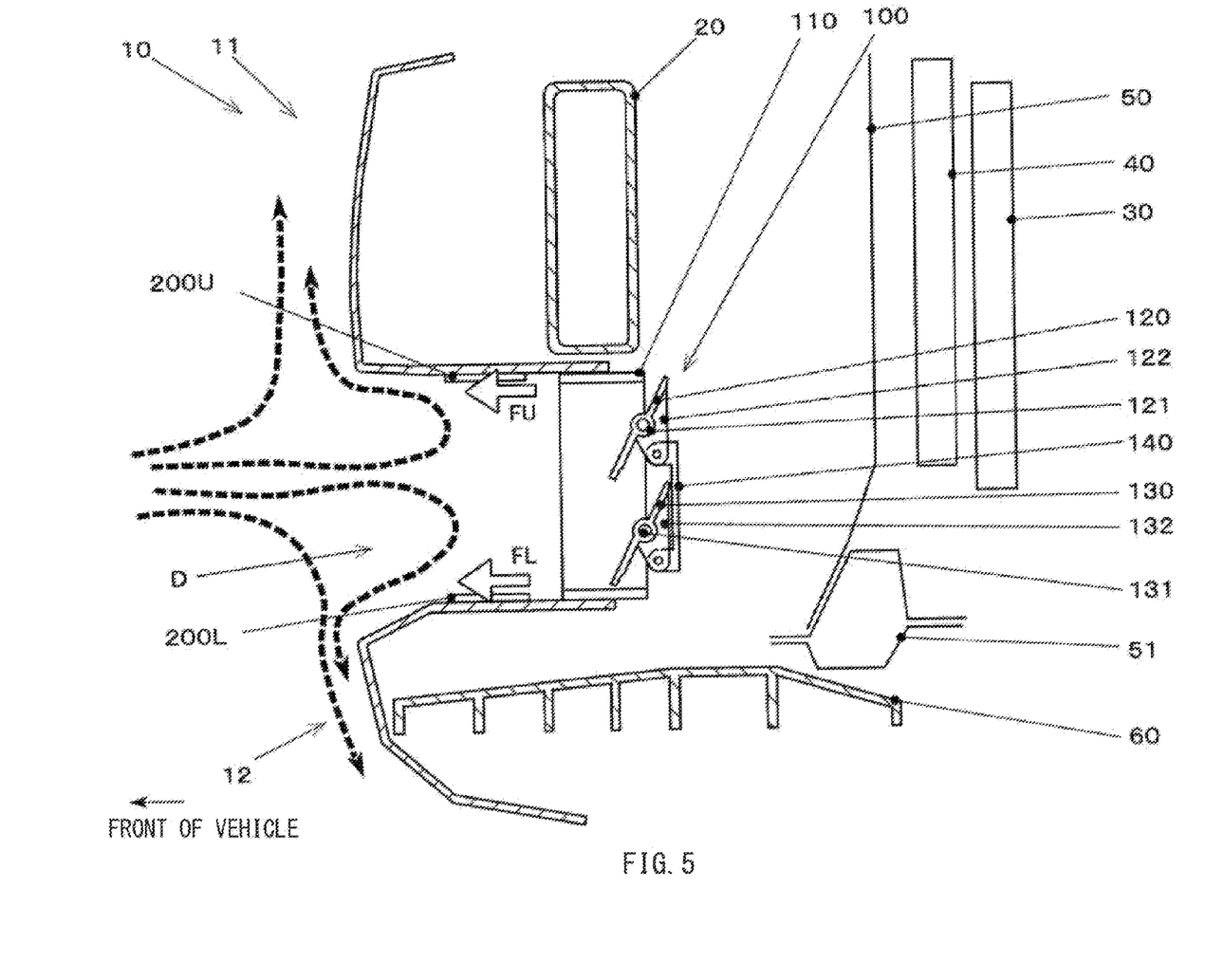
FIG. 5 is a schematic cross-sectional view of an example of the front end of the vehicle body of the vehicle including the airflow adjusting apparatus according to one example embodiment, illustrating a state in which the shutter is open to a small opening degree.

FIG. 5 is a schematic cross-sectional view of an example of the front end of the vehicle body of the vehicle 1 including the airflow adjusting apparatus according to the first example embodiment, illustrating a state in which the shutter 100 is open to a small opening degree.

As illustrated in these drawings, the vehicle 1 may include a bumper beam 20, the radiator 30, the condenser 40, a radiator panel 50, an energy absorbing member (EA member) 60, and the shutter 100, for example.

The bumper beam 20 may be disposed in the rear of the body 11 of the bumper face 10. The bumper beam 20 may be a beam-shaped member extending substantially along the vehicle widthwise direction.

The bumper beam 20 may have a substantially rectangular closed cross-section.

The radiator 30 may be a heat exchanger. The radiator 30 may be configured to cool cooling water for an unillustrated engine, by heat exchange with traveling wind.

The radiator 30 may include a large number of fins disposed around a tube through which the cooling water passes.

The condenser 40 may be a heat exchanger. The condenser 40 may be configured to cool and condense a gas-phase refrigerant of an unillustrated air conditioner into a liquid phase, by heat exchange with traveling wind.

The condenser 40 may include a large number of fins disposed around a tube through which the refrigerant passes.

The condenser 40 may be disposed in front of the radiator 30.

In one embodiment, the radiator 30 and the condenser 40 may serve as an "air-blowing target".

The radiator panel 50 may be provided around the radiator 30 and the condenser 40. The radiator panel 50 may be a frame-shaped vehicle body structure member. The radiator panel 50 may support the radiator 30 and the condenser 40.

A lower part of the radiator panel 50 may be provided with a radiator panel lower member 51. The radiator panel lower member 51 may join a pair of sheet metal panels into a so-called "Monaka (bean-jam-filled wafers)" shape to form a closed cross-section.

The EA member 60 may be disposed in the rear of the air dam part 12. The EA member 60 may be configured to transmit, to the vehicle body, load applied from the air dam part 12 upon collision, while absorbing the load.

The EA member 60 may include a plurality of ribs arranged in a front-rear direction of the vehicle, extending substantially along a vertical direction, and coupled together at an upper surface. The EA member 60 may be a one-piece member, for example, including a resin material.

The EA member 60 may have a front end inserted in the air dam part 12. A rear part of the EA member 60 may be disposed below the radiator panel 50.

The shutter 100 may be provided at the inside, e.g., rear side, of the duct D of the bumper face 10. The shutter 100 is an opening-degree-variable duct opening-closing unit that substantially opens and closes the duct D.

The shutter 100 may include a frame 110, an upper louver 120, a lower louver 130, a link 140, and an actuator 150 (see FIG. 7), for example.

The frame 110 may be provided substantially along an inner circumference of the duct D. The frame 110 may have a substantially rectangular planar shape as viewed from the front side of the vehicle.

The inside of the frame 110 may serve as an airflow passage through which an airflow, such as traveling wind, passes when the shutter 100 is open.

The upper louver 120 and the lower louver 130 may extend substantially along the vehicle widthwise direction. The upper louver 120 and the lower louver 130 may be strip-shaped members provided across left and right side ends of the frame 110.

The upper louver 120 and the lower louver 130 may be disposed apart from each other in the vertical direction. The upper louver 120 and the lower louver 130 may be configured to pivot, respectively, about a rotating shaft 121 and a rotating shaft 131 disposed substantially along their respective longitudinal directions.

The rotating shaft 121 may be disposed in the middle in a widthwise direction of the upper louver 120. The rotating shaft 131 may be disposed in the middle in a widthwise direction of the lower louver 130.

The upper louver 120 and the lower louver 130 may pivot between a full-open state in which their respective bodies are disposed substantially horizontally, and a full-closed state in which their respective bodies are disposed substantially along the vertical direction.

In the full-closed state, the upper louver 120 and the lower louver 130 may be configured to substantially close the inside of the frame 110.

The upper louver 120 may be provided with an arm 122. In a case where the upper louver 120 is in the full-closed state, the arm 122 may protrude rearward with respect to the rotating shaft 121. The lower louver 130 may be provided with an arm 132. In a case where the lower louver 130 is in the full-closed state, the arm 132 may protrude rearward with respect to the rotating shaft 131.

The arm 122 may be integrated with the upper louver 120. The arm 132 may be integrated with the lower louver 130.

The link 140 may couple a tip of the arm 122 of the upper louver 120 and a tip of the arm 132 of the lower louver 130, in the rear of the upper louver 120 and the lower louver 130. The link 140 may be coupled to the arms 122 and 132 to be pivotable.

The actuator 150 (see FIG. 7) may be provided, for example, on a side of the frame 110, near the upper louver 120. The actuator 150 may be configured to drive the upper louver 120, in response to an instruction from an engine control unit 320.

Figure 7:
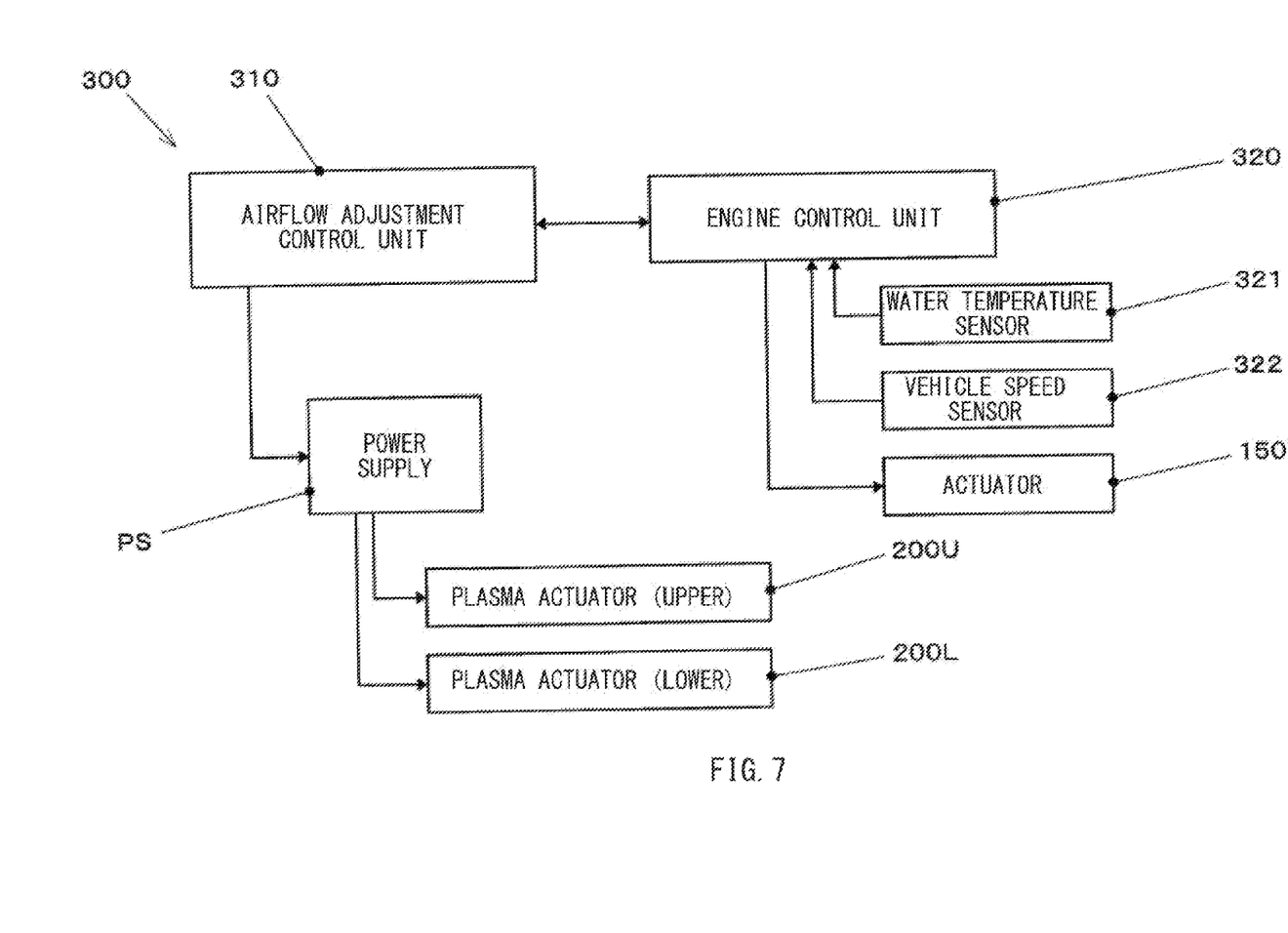
FIG. 7 is a block diagram schematically illustrating an example of a configuration of a control system that controls plasma actuators in the airflow adjusting apparatus according to one example embodiment.

The actuator 150 may include, for example, an electric motor and a reduction gear mechanism.

When the upper louver 120 is driven by the actuator 150 to pivot, the lower louver 130 may be caused to pivot in conjunction with the upper louver 120 by the link 140.

The shutter 100 may be substantially closed by pivoting of the upper louver 120 and the lower louver 130. In one example, the upper louver 120 and the lower louver 130 may pivot until a front end of the upper louver 120 and a front end of the lower louver 130 in the open state illustrated in FIG. 3 come substantially directly below the rotating shafts 121 and 131, as illustrated in FIG. 4. Thus, the inside of the frame 110 may be substantially closed by the upper louver 120 and the lower louver 130.

A plasma actuator 200U may be provided on an upper surface of the duct D, i.e., a lower surface of the body 11, of the bumper face 10. In one embodiment, the upper surface of the duct D may serve as a "first face".

A plasma actuator 200L may be provided on a lower surface of the duct D, i.e., an upper surface of the air dam part 12, of the bumper face 10. In one embodiment, the lower surface of the duct D may serve as a "second face".

The plasma actuator 200U is configured to generate an airflow FU along the front-rear direction of the vehicle. The plasma actuator 200L is configured to generate an airflow FL along the front-rear direction of the vehicle. In one embodiment, the plasma actuator 200U may serve as a "first airflow generator". In one embodiment, the plasma actuator 200L may serve as a "second airflow generator".

Figure 6:
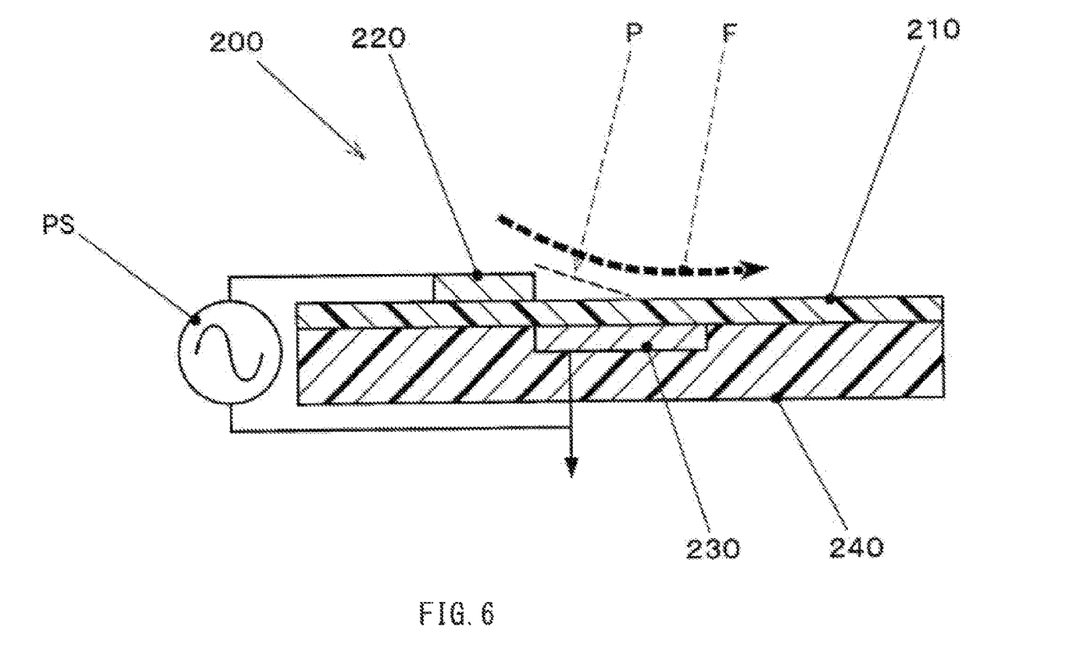
FIG. 6 is a schematic cross-sectional view of an example of a two-electrode plasma actuator provided in the airflow adjusting apparatus according to one example embodiment.

The plasma actuators 200U and 200L may each have a configuration similar to that of a two-electrode plasma actuator 200 described below.

The plasma actuator 200 provided above the duct D may serve as the plasma actuator 200U. The plasma actuator 200 provided below the duct D may serve as the plasma actuator 200L.

FIG. 6 is a schematic cross-sectional view of a two-electrode plasma actuator to be provided in the airflow adjusting apparatus according to the first example embodiment.

The plasma actuator 200 may include, for example, a dielectric 210, an upper electrode 220, a lower electrode 230, and an insulator 240.

For example, the dielectric 210 may be a sheet-shaped member including a material such as fluorocarbon resin. Non-limiting examples of the fluorocarbon resin may include polytetrafluoroethylene.

The upper electrode 220 and the lower electrode 230 may each include an electrically-conductive tape including, for example, a thin metal film such as a thin copper film.

The upper electrode 220 may be provided on an outer surface side of the dielectric 210. The outer surface side of the dielectric 210 refers to a side that is exposed to the outside when the plasma actuator 200 is attached to a part such as the vehicle body.

The lower electrode 230 may be provided on an inner surface side of the dielectric 210 that is opposite to the outer surface side of the dielectric 210.

The upper electrode 220 and the lower electrode 230 may be so disposed as to be offset with each other in a surface direction of the dielectric 210.

The insulator 240 may be a sheet-shaped member serving as a base of the plasma actuator 200. The insulator 240 may be so disposed on the inner surface side of the dielectric 210 as to cover the lower electrode 230.

When the upper electrode 220 and the lower electrode 230 of the plasma actuator 200 each receive an alternating-current voltage having a predetermined waveform applied by a power supply PS, plasma discharge P may be generated between the upper electrode 220 and the lower electrode 230.

It may be necessary that the applied voltage be high enough to cause electrical breakdown to generate the plasma discharge P. For example, the applied voltage may be within a range from about 1 kV to about 10 kV.

Further, the applied voltage may have a frequency, for example, within a range from about 1 kHz to about 10 kHz.

Upon generation of the plasma discharge P, air on the outer surface side of the plasma actuator 200 may be drawn to the plasma discharge P, generating a wall jet airflow F.

The plasma actuator 200 may also be configured to control the waveform of the applied alternating-current voltage to thereby reverse the direction of the airflow F.

The airflow adjusting apparatus according to the first example embodiment may include a control system 300 described below, in order to supply driving electric power to the plasma actuator 200 (200U, 200L) described above to generate the airflows FU and FL, thereby performing airflow adjustment in and around the duct D.

FIG. 7 is a block diagram illustrating, a configuration of the control system 300 for the plasma actuators 200U and 200L in the airflow adjusting apparatus according to the first example embodiment.

The control system 300 may include an airflow adjustment control unit 310 and the engine control unit 320, for example.

The airflow adjustment control unit 310 and the engine control unit 320 may each include, for example: an information processor such as a central processing unit (CPU); a storage device such as a random-access memory (RAM) or a read-only memory (ROM); an input-output interface; and a bus that couples these units to each other. The airflow adjustment control unit 310 and the engine control unit 320 may be coupled to be able to communicate with each other, for example, via an on-board local area network (LAN) device such as a controller area network (CAN) communication system.

The airflow adjustment control unit 310 may control the power supply PS that supplies electric power to the plasma actuators 200U and 200L. The airflow adjustment control unit 310 may thereby control whether or not to cause the plasma actuator 200U to generate the airflow FU, and whether or not to cause the plasma actuator 200L to generate the airflow FL. In a case of causing any of the plasma actuators 200U and 200L to generate an airflow, the airflow adjustment control unit 310 may also control intensity and wind direction of the generated airflow. In one embodiment, the airflow adjustment control unit 310 may serve as an "airflow adjustment processor".

Operation of the airflow adjustment control unit 310 will be described in detail later.

The engine control unit 320 may be configured to comprehensively control the unillustrated engine and its auxiliaries. The engine may serve as a power source for travel of the vehicle.

As the engine, a water-cooled gasoline engine may be used, for example.

The engine control unit 320 may be configured to set target torque on the basis of, for example, an amount of a driver's operation on an accelerator pedal, and to control an intake air amount, boost pressure, a fuel injection amount, ignition timing, valve timing, and an EGR ratio, for example, to make actual torque generated by the engine match the target torque.

The engine control unit 320 may also be configured, to appropriately control temperature around a cylinder head of the engine, to give an instruction to the actuator 150 on the basis of cooling water temperature detected by a water temperature sensor 321, a vehicle speed detected by a vehicle speed sensor 322, and an operational state (e.g., load state) of the engine, to switch an open/closed state of the shutter 100.

The water temperature sensor 321 may be provided in a passage through which cooling water flows inside the engine, and configured to output a voltage corresponding to temperature of the cooling water.

The engine control unit 320 may be configured to calculate the cooling water temperature of the engine, on the basis of the output of the water temperature sensor 321.

The vehicle speed sensor 322 may be provided on a hub mounted with a wheel, and configured to output a vehicle speed signal with periodicity corresponding to a rotational speed of the wheel.

The engine control unit 320 may be configured to calculate a traveling speed of the vehicle, i.e., the vehicle speed, on the basis of the output of the vehicle speed sensor 322.

The vehicle speed may be correlated with an airspeed of the vehicle, and is assumed to substantially match the airspeed of the vehicle, for example, in a range where a wind speed around the vehicle is relatively low.

During normal operation of the vehicle, the engine control unit 320 may control the actuator 150 to put the shutter 100 into an open state in a low-speed range where the vehicle speed is less than a predetermined threshold, and to put the shutter 100 into a closed state in a high-speed range where the vehicle speed is the threshold or more.

Thus, it is possible to ensure sufficient cooling ability in the low-speed range where an amount of traveling wind introduced into the radiator 30, for example, decreases if traveling wind is introduced from only the grille 3 open at all times. It is also possible to suppress air resistance on the vehicle during high-speed traveling, thereby improving fuel economy and maximum speed, for example.

In a case where the cooling water temperature detected by the water temperature sensor 321 is in a high-temperature state, or a case where the target torque set by the engine control unit 320 is high (case of high-load state), for example, the threshold at which to switch opening and closing of the shutter 100 may be shifted to the high-speed side to widen a range where the shutter 100 is put into an open state. This makes it possible to prevent overheating of the engine.

The actuator 150 may include an encoder that detects an angular position of its output shaft, and the engine control unit 320 may be configured to determine an opening degree of the shutter 100 on the basis of output of the encoder.

The airflow adjustment control unit 310 may be configured to control, on the basis of the opening and closing of the shutter 100 described above, direction and intensity (speed) of airflows to be generated by the plasma actuators 200U and 200L.

Figure 8:
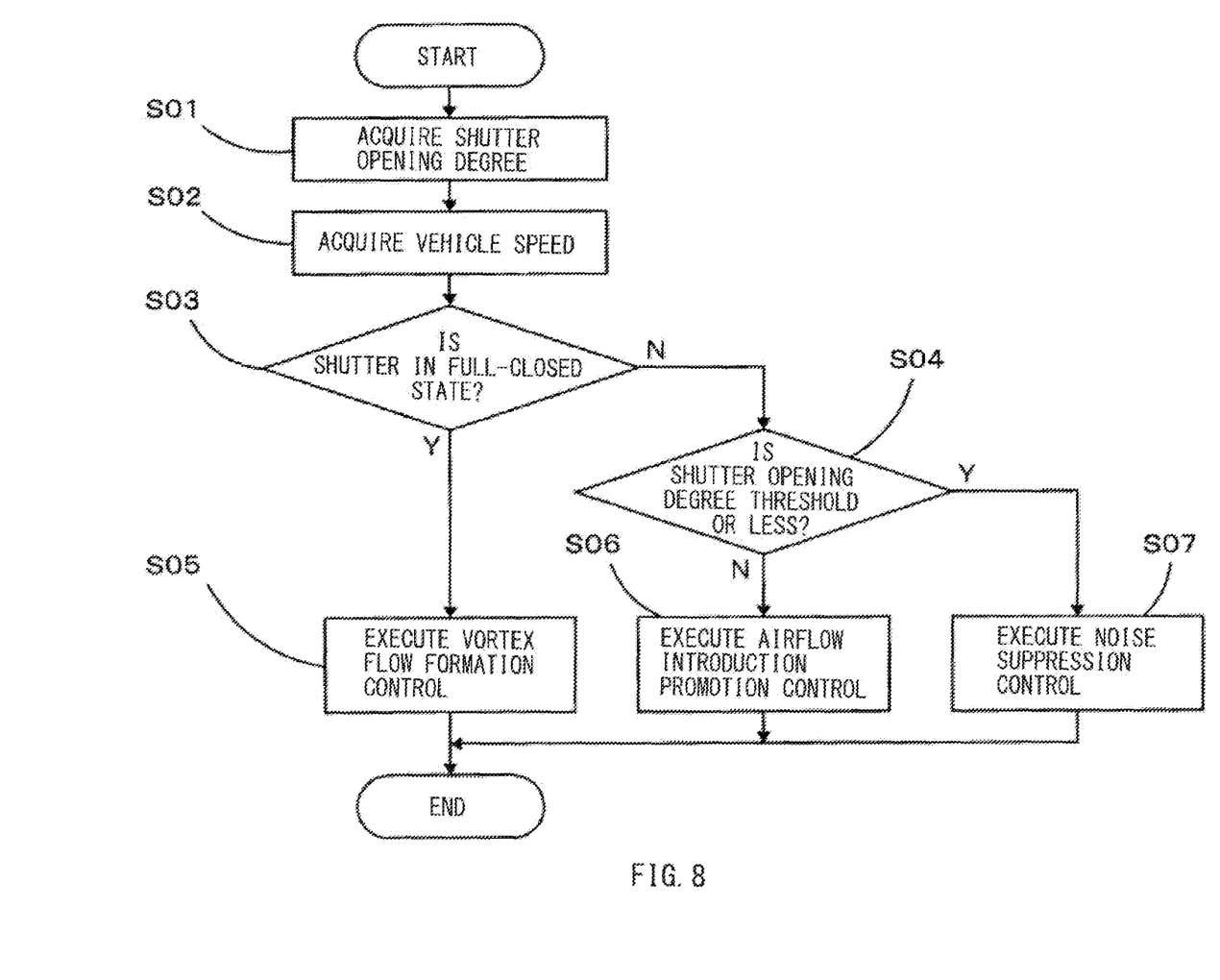
FIG. 8 is a flowchart illustrating an example of control of the plasma actuators to be performed by an airflow adjustment control unit according to one example embodiment.

FIG. 8 is a flowchart illustrating an example of control of the plasma actuators 200U and 200L to be performed by the airflow adjustment control unit 310 according to the first example embodiment.

The control is described below in order of step.

[Step S01: Acquisition of Shutter Opening Degree]

The airflow adjustment control unit 310 may acquire, from the engine control unit 320, information related to the opening degree of the shutter 100 (e.g., 0 to 100%).

Thereafter, the process may be caused to proceed to step S02.

[Step S02: Acquisition of Vehicle Speed]

The airflow adjustment control unit 310 may acquire, via the engine control unit 320, information related to the vehicle speed detected by the vehicle speed sensor 322.

Thereafter, the process may be caused to proceed to step S03.

[Step S03: Determination of Shutter Full-Closed State]

The airflow adjustment control unit 310 may determine whether the shutter 100 is in the full-closed state in which the opening degree is 0%.

If the shutter 100 is in the full-closed state (S03: Y), the process may be caused to proceed to step S05, and otherwise (S03: N) the process may be caused to proceed to step S04.

[Step S04: Determination of Shutter Small Opening Degree State]

The airflow adjustment control unit 310 may determine whether the shutter 100 is in a small opening degree state in which the opening degree of the shutter 100 is a predetermined threshold or less.

The threshold may be set in consideration of an opening degree at which an opening of the shutter 100 has a slit shape and its gap is small, in which case whistle-like noise is caused by passage of an airflow.

Such a small opening degree state may transiently occur, for example, in a case where the shutter 100 is opened from the full-closed state, or a case where the shutter 100 is put into the full-closed state from the open state.

If the opening degree of the shutter 100 is the threshold or less (S04: Y), the process may be caused to proceed to step S07, and otherwise (S04: N) the process may be caused to proceed to step S06.

[Step S05: Execution of Vortex Flow Formation Control]

The airflow adjustment control unit 310 may execute, as illustrated in FIG. 4, vortex flow formation control of causing the plasma actuator 200U at an upper part of the duct D to generate the airflow FU directed to the rear side of the vehicle, and causing the plasma actuator 200L at a lower part of the duct D to generate the airflow FL directed to the front side of the vehicle.

The intensity (speed) of the airflows FU and FL in this case may be controlled to increase with an increase in the vehicle speed.

Thus, at the inside of the duct D, a vortex flow (swirl flow) that swirls about an axis extending in the vehicle widthwise direction may be formed to flow downward at the rear side of the vehicle, e.g., immediately before the shutter 100, and to flow upward at the front side of the vehicle, e.g., surface side of the bumper face 10. In FIGS. 3, 4, 5, and 9, a behavior of airflows, such as traveling wind, is indicated by dashed-line arrows.

A portion of the vortex flow may form an upward flow that flows out from the inlet of the duct D and flows upward along a surface of the body 11 of the bumper face 10.

Such an upward flow may be introduced into the engine room from the grille 3 provided above the duct D.

Thereafter, the airflow adjustment control unit 310 may end the series of processes or make a return.

[Step S06: Execution of Airflow Introduction Promotion Control]

The airflow adjustment control unit 310 may execute, as illustrated in FIG. 3, airflow introduction promotion control of causing the plasma actuator 200U at the upper part of the duct D to generate the airflow FU directed to the rear side of the vehicle, and causing the plasma actuator 200L at the lower part of the duct D to generate the airflow FL directed to the rear side of the vehicle.

The intensity (speed) of the airflows FU and FL in this case may be controlled to increase with an increase in the vehicle speed. In the airflow introduction promotion control, the airflow adjustment control unit 310 may acquire, from the engine control unit 320, information related to the operational state of the engine, such as the cooling water temperature or the load state. In a case where the cooling water temperature is high or a case of a high-load state, the airflow adjustment control unit 310 may perform control of enhancing the intensity of the airflows FU and FL.

This promotes airflow introduction from the duct D into the radiator 30, for example, and improves cooling performance of the vehicle.

Thereafter, the airflow adjustment control unit 310 may end the series of processes or make a return.

[Step S07: Execution of Noise Suppression Control]

The airflow adjustment control unit 310 may execute, as illustrated in FIG. 5, noise suppression control of causing the plasma actuator 200U at the upper part of the duct D to generate the airflow FU directed to the front side of the vehicle, and causing the plasma actuator 200L at the lower part of the duct D to generate the airflow FL directed to the front side of the vehicle.

The intensity (speed) of the airflows FU and FL in this case may be controlled to increase with an increase in the vehicle speed.

This makes it possible to suppress and reduce speed of an airflow flowing inside the duct D to the rear side of the vehicle, and to suppress occurrence of aerodynamic noise (so-called whistle noise) at a gap formed by the louvers of the shutter 100.

Thereafter, the airflow adjustment control unit 310 may end the series of processes or make a return.

As described above, according to the first example embodiment of the technology, example effects described below are achievable.

(1) In a case where the shutter 100 is in the closed state, the plasma actuators 200U and 200L are caused to generate the airflows FU and FL in opposite directions, which makes it possible to form a vortex flow that swirls in a recess formed by the duct D.

A region of the vortex flow on the front side of the vehicle 1 acts as an air curtain, which suppresses traveling wind flowing into the duct D from the outside to disturb a flow field. This makes it possible to reduce air resistance and aerodynamic noise of the vehicle 1.

(2) With an increase in the vehicle speed correlated with the airspeed of the vehicle 1, the intensity of the airflows FU and FL to be generated by the plasma actuators 200U and 200L in the vortex flow formation control may be increased. This makes it possible to enhance intensity of the vortex flow with an increase in the airspeed of the vehicle 1, and to achieve the above-described example effect in a wide speed range.

(3) In a case where the shutter 100 is in the open state, the airflow introduction promotion control of causing the plasma actuators 200U and 200L to generate the airflows FU and FL that flow to the outlet side with respect to the duct D may be performed. The outlet side may also be referred to as the rear side of the vehicle or the radiator 30 side. This makes it possible to increase a flow rate and a flow velocity of an airflow to be introduced into the radiator 30, for example, and to promote a cooling effect, for example.

(4) With an increase in the vehicle speed, the intensity of the airflows FU and FL to be generated by the plasma actuators 200U and 200L in the airflow introduction promotion control may be increased. This makes it possible to achieve the above-described example effect in a wide speed range.

(5) With an increase in thermal load on the engine to be cooled by the radiator 30, the intensity of the airflows FU and FL to be generated by the plasma actuators 200U and 200L in the airflow introduction promotion control may be increased. This makes it possible to perform appropriate cooling preventing overheating of the engine, for example.

(6) In the vortex flow formation control, the plasma actuator 200U may be caused to generate the airflow FU to the rear side of the vehicle, and the plasma actuator 200L may be caused to generate the airflow FL to the front side of the vehicle. Thus, in a case where the shutter 100 is in the closed state, an airflow flowing out from the inlet of the duct D flows toward the grille 3 above the body 11 of the bumper face 10, which makes it possible to promote airflow introduction to the grille 3.

(7) In a case where the opening degree, i.e., opening area, of the shutter 100 is a predetermined value or less, the noise suppression control of causing the plasma actuators 200U and 200L to generate the airflows that flow to the inlet side with respect to the duct D may be performed. Thus, in a case where the shutter 100 is open to a small opening degree close to the full-closed state, it is possible to suppress occurrence of aerodynamic noise (so-called whistle noise) due to an increase in flow velocity of an airflow at the slit-shaped opening.

(8) Causing the plasma actuators 200U and 200L to generate airflows makes it possible to generate airflows with high responsiveness with the use of a simple configuration without a movable part, making it possible to reliably achieve the above-described example effect.

Second Example Embodiment

Described next is an airflow adjusting apparatus according to a second example embodiment of the technology.

In the following description of the second example embodiment, a component common to the first example embodiment is denoted with the same reference sign and will not be described further. Described mainly below are points different from the first example embodiment.

Figure 9:
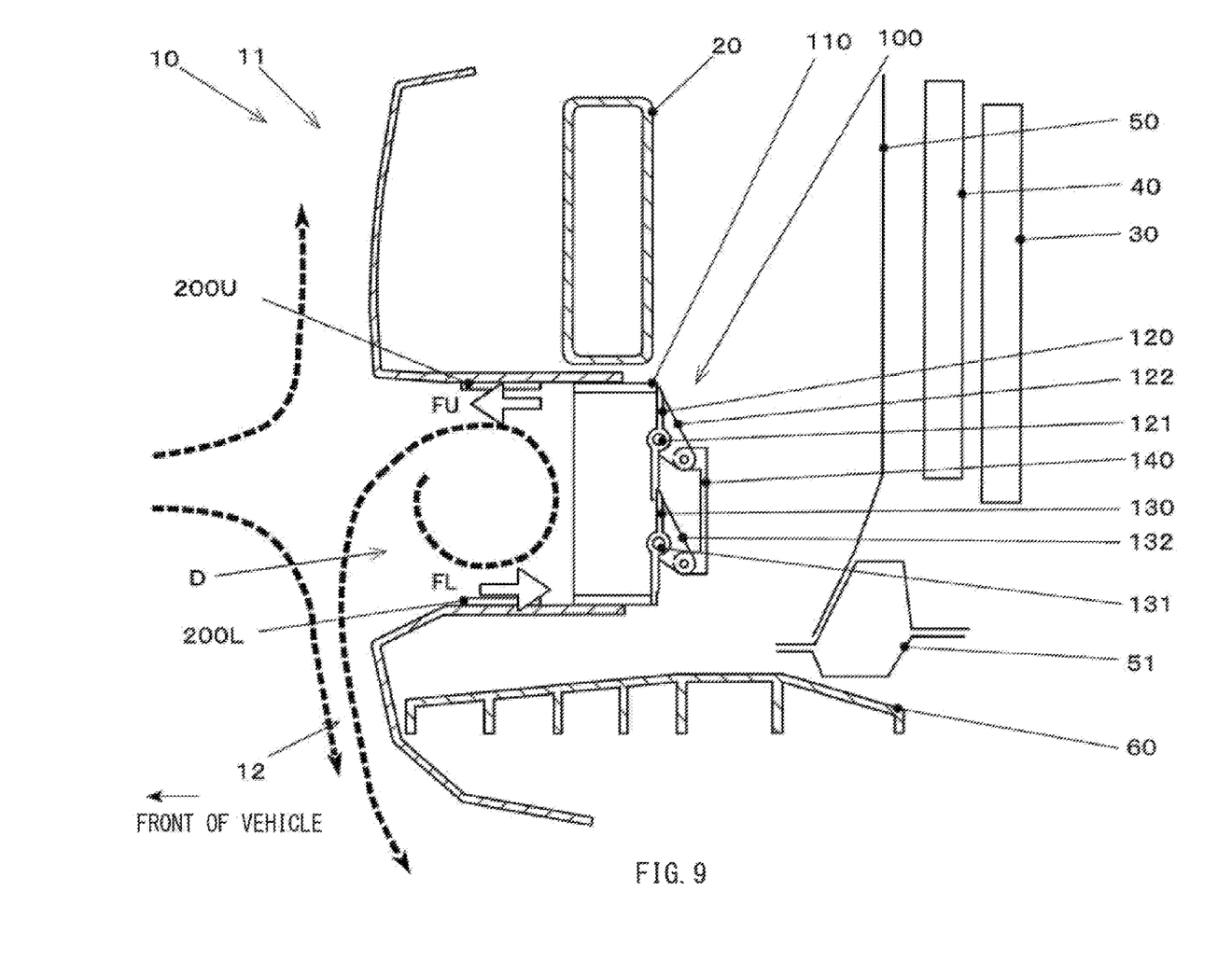
FIG. 9 is a schematic cross-sectional view of an example of a front end of a vehicle body of a vehicle including an airflow adjusting apparatus according to one example embodiment of the technology, illustrating a state in which a shutter is closed.

FIG. 9 is a schematic cross-sectional view of an example of a front end of a vehicle body of a vehicle including an airflow adjusting apparatus according to the second example embodiment of the technology, illustrating a state in which the shutter 100 is closed. In the second example embodiment, the plasma actuator 200L may serve as a "first airflow generator". In second example embodiment, the plasma actuator 200U may serve as a "second airflow generator".

In the airflow adjusting apparatus according to the second example embodiment, in the vortex flow formation control, the plasma actuator 200U at the upper part of the duct D may be caused to generate the airflow FU directed to the front side of the vehicle, and the plasma actuator 200L at the lower part of the duct D may be caused to generate the airflow FL directed to the rear side of the vehicle.

Thus, at the inside of the duct D, a vortex flow (swirl flow) that swirls forward about an axis extending in the vehicle widthwise direction may be formed to flow upward at the rear side of the vehicle, e.g., immediately before the shutter 100, and to flow downward at the front side of the vehicle, i.e., surface side of the bumper face 10.

A portion of the vortex flow may form a downward flow that flows out from the inlet of the duct D and flows toward a road surface along a surface of the air dam part 12 of the bumper face 10.

In the second example embodiment described above, effects similar to those of the first example embodiment described above, excluding the example effect described in (6), are achievable. In addition, in a case where the shutter 100 is in the closed state, an airflow flowing out from the inlet of the duct D flows downward to serve as an air curtain between the vehicle body and the road surface, which suppresses inflow of an airflow.

This makes it possible to prevent an airflow flowing in under the vehicle body from forming disturbance to worsen air resistance, aerodynamic noise, and aerodynamic vibration.

[Modifications]

The technology is not limited to the example embodiments described above, and various modifications and alternations may be made for each of the example embodiments. Such various modifications and alternations also belong to the technical scope of the technology.

(1) The configurations of the airflow adjusting apparatus and the vehicle are not limited to those described above in the example embodiments, and may be modified appropriately.

The example embodiments describe a vehicle, such as an automobile, as an example of a movable body. Alternatively, at least one embodiment of the technology may be applicable to various movable bodies including, for example, an aircraft such as a fixed-wing aircraft or a rotorcraft, various vehicles having a flight function, a railroad vehicle, and a vessel. Non-limiting examples of the rotorcraft may include a multi-copter.

(2) According to the example embodiments, a two-electrode plasma actuator may be used as an airflow generator. Alternatively, for example, a plasma actuator including three or more electrodes may be used in which the upper electrode, the lower electrode, or both includes two or more electrodes.

In another example, a device other than a plasma actuator may be used as the airflow generator.

(3) According to the example embodiments, airflow generators (plasma actuators) may be provided above and below the duct, but arrangement of the airflow generators is not limited thereto and may be changed as appropriate.

For example, a configuration may be adopted in which a pair of airflow generators is provided on inner side surfaces, disposed to be opposed to each other, of the duct, i.e., in which the airflow generators are apart from each other in a horizontal direction.

According to at least one embodiment of the technology, in a case where the duct opening-closing unit is in a closed state, the first airflow generator and the second airflow generator are caused to generate airflows in opposite directions, which makes it possible to form a vortex flow that swirls in a recess formed by the duct.

A region of the vortex flow on the front side of the movable body acts as an air curtain, which suppresses an airflow flowing into the duct from the outside to disturb a flow field, making it possible to reduce air resistance and aerodynamic noise.

According to at least one embodiment of the technology, intensity of the vortex flow may be enhanced with an increase in airflow speed around the inlet of the duct corresponding to an increase in airspeed of the movable body, which makes it possible to achieve the above-described example effect in a wide speed range.

According to at least one embodiment of the technology, in a case where the duct opening-closing unit is in an open state, the first and second airflow generators may be caused to generate airflows in a direction along an airflow flowing direction in the duct. This makes it possible to increase a flow rate of an airflow to be introduced into the air-blowing target, and to promote a cooling effect, for example.

In the airflow introduction promotion control, the airflow adjustment processor according to at least one embodiment of the technology may increase the intensity of the airflows to be generated by the first airflow generator and the second airflow generator with an increase in the airspeed of the movable body.

Thus, enhancing intensity of the airflows along a flow in the duct with an increase in airflow speed around the inlet of the duct corresponding to the increase in the airspeed of the movable body makes it possible to achieve the above-described example effect in a wide speed range.

In the airflow introduction promotion control, the airflow adjustment processor according to at least one embodiment of the technology may increase the intensity of the airflows to be generated by the first airflow generator and the second airflow generator with an increase in thermal load on the air-blowing target.

Thus, increasing intensity of the airflows with the increase in the thermal load on the air-blowing target makes it possible to perform appropriate cooling preventing overheating of the air-blowing target.

According to at least one embodiment of the technology, in a case where the duct opening-closing unit is in the closed state, an airflow flowing out from the inlet of the duct flows toward an opening, which makes it possible to promote airflow introduction into the opening.

For example, if the movable body is a vehicle and the opening is a radiator grille, intensifying airflow introduction into the radiator grille in a case where the duct opening-closing unit is in the closed state makes it possible to improve cooling performance of the vehicle.

According to at least one embodiment of the technology, in a case where the duct opening-closing unit is in the closed state, an airflow flowing out from the inlet of the duct flows downward to serve as an air curtain between the vehicle body and a road surface, which suppresses inflow of an airflow.

This makes it possible to prevent an airflow flowing in under the vehicle body from forming disturbance to worsen air resistance, aerodynamic noise, and aerodynamic vibration.

In at least one embodiment of the technology, the airflow adjustment processor may perform, in a case where an opening area of the duct opening-closing unit is a predetermined value or less, the noise suppression control of causing the first airflow generator and the second airflow generator to generate airflows that flow to the inlet side with respect to the duct.

Thus, in a case where the duct opening-closing unit is open to a small opening degree close to the full-closed state, it is possible to suppress occurrence of aerodynamic noise (so-called whistle noise) due to an increase in flow velocity of an airflow at the slit-shaped opening.

In at least one embodiment of the technology, the first airflow generator, the second airflow generator, or both may include a plasma actuator including at least a pair of electrodes disposed across a dielectric and a power supply that applies an alternating-current voltage to the electrodes.

This makes it possible to generate airflows with high responsiveness with the use of a simple configuration without a movable part, making it possible to reliably achieve the above-described example effect.

As described above, at least one embodiment of the technology makes it possible to provide an airflow adjusting apparatus that appropriately adjusts an airflow around a duct provided with an opening-closing unit.

The airflow adjustment control unit 310 illustrated in FIG. 7 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment control unit 310. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the airflow adjustment control unit 310 illustrated in FIG. 7.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An airflow adjusting apparatus comprising:
    a duct having an inlet on an inlet side and an outlet on an outlet side, the inlet being open toward a front of a movable body, the outlet being configured to guide an airflow to an air-blowing target inside the movable body;
    a duct opening-closing unit configured to open and close the duct;
    a first airflow generator provided on a first face of an inner surface of the duct;
    a second airflow generator provided on a second face of the inner surface of the duct, the second face being opposed to the first face; and
    an airflow adjustment processor configured to perform vortex flow formation control of causing the first airflow generator to generate a first airflow that directs to the outlet side with respect to the duct and causing the second airflow generator to generate a second airflow that directs to the inlet side with respect to the duct based on the duct opening-closing unit being in a closed state.

2. The airflow adjusting apparatus according to claim 1, wherein the airflow adjustment processor is configured to, in the vortex flow formation control, increase intensity of the first airflow and intensity of the second airflow in accordance with an increase in airspeed of the movable body.

3. The airflow adjusting apparatus according to claim 1, wherein the airflow adjustment processor is configured to, in a case where the duct opening-closing unit is in an open state, perform airflow introduction promotion control of causing the first airflow generator and the second airflow generator to generate airflows that direct to the outlet side with respect to the duct.

4. The airflow adjusting apparatus according to claim 2, wherein the airflow adjustment processor is configured to, in a case where the duct opening-closing unit is in an open state, perform airflow introduction promotion control of causing the first airflow generator and the second airflow generator to generate airflows that direct to the outlet side with respect to the duct.

5. The airflow adjusting apparatus according to claim 1, wherein
    an opening configured to introduce an airflow into the movable body is provided adjacent to the inlet of the duct, and the first airflow generator is positioned closer to the opening than the second airflow generator.

6. The airflow adjusting apparatus according to claim 2, wherein
an opening configured to introduce an airflow into the movable body is provided adjacent to the inlet of the duct, and
the first airflow generator is positioned closer to the opening than the second airflow generator.

7. The airflow adjusting apparatus according to claim 3, wherein
an opening configured to introduce an airflow into the movable body is provided adjacent to the inlet of the duct, and
the first airflow generator is positioned closer to the opening than the second airflow generator.

8. The airflow adjusting apparatus according to claim 4, wherein
an opening configured to introduce an airflow into the movable body is provided adjacent to the inlet of the duct, and
the first airflow generator is positioned closer to the opening than the second airflow generator.

9. The airflow adjusting apparatus according to claim 1, wherein
the movable body includes a vehicle,
the duct is provided at a front lower part of a vehicle body of the vehicle, and
the first airflow generator is disposed below the second airflow generator.

10. The airflow adjusting apparatus according to claim 2, wherein
the movable body includes a vehicle,
the duct is provided at a front lower part of a vehicle body of the vehicle, and
the first airflow generator is disposed below the second airflow generator.

11. The airflow adjusting apparatus according to claim 3, wherein
the movable body includes a vehicle,
the duct is provided at a front lower part of a vehicle body of the vehicle, and
the first airflow generator is disposed below the second airflow generator.

12. The airflow adjusting apparatus according to claim 4, wherein
the movable body includes a vehicle,
the duct is provided at a front lower part of a vehicle body of the vehicle, and
the first airflow generator is disposed below the second airflow generator.

13. The airflow adjusting apparatus according to claim 1, wherein the airflow adjustment processor controls the first airflow generator independently of the second airflow generator.

14. The airflow adjusting apparatus according to claim 1, wherein the airflow adjustment processor is configured to, in the vortex flow formation control, control intensity of the first airflow and intensity of the second airflow based on a speed of the movable body.

15. The airflow adjusting apparatus according to claim 1, wherein the airflow adjustment processor is configured to, in the vortex flow formation control, control intensity of the first airflow and intensity of the second airflow based on an operation state of the movable body.

16. The airflow adjusting apparatus according to claim 1, wherein the vortex flow formation control creates a vortex flow via the first airflow and the second airflow that swirls about an axis extending in the movable body widthwise direction to flow downward at a rear side of the movable body and to flow upward at a front side of the movable body.

17. The airflow adjusting apparatus according to claim 1, wherein the airflow adjustment processor is configured to, in the vortex flow formation control, control intensity of the first airflow and intensity of the second airflow in relation to a speed of the movable body, thereby to suppress an occurrence of whistle noise at a gap formed at the outlet side of the duct.

18. The airflow adjusting apparatus according to claim 1, wherein the movable body includes a vehicle,
wherein the duct is provided at a front lower part of a vehicle body of the vehicle, and
wherein, based on the duct opening-closing unit being in the closed state, the airflow flowing out from the inlet of the duct flows toward a grille above a body of a bumper face of the vehicle.

19. An airflow adjusting apparatus comprising:
a duct having an inlet on an inlet side and an outlet on an outlet side, the inlet being open toward a front of a movable body, the outlet being configured to guide an airflow to an air-blowing target inside the movable body;
a duct opening-closing unit configured to open and close the duct;
a first airflow generator provided on a first face of an inner surface of the duct;
a second airflow generator provided on a second face of the inner surface of the duct, the second face being opposed to the first face; and
an airflow adjustment processor configured to perform vortex flow formation control of causing the first airflow generator to generate a first airflow and causing the second airflow generator to generate a second airflow based on the duct opening-closing unit being in a closed state,
wherein the first airflow is generated in an opposite direction as the second airflow.

* * * * *